(12) United States Patent
Zoephel

(10) Patent No.: US 8,217,998 B2
(45) Date of Patent: Jul. 10, 2012

(54) MICROSCOPE PICTURE PROCESSING

(75) Inventor: Helmut Zoephel, Hallbergmoos (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 1322 days.

(21) Appl. No.: 11/881,594

(22) Filed: Jul. 27, 2007

(65) Prior Publication Data

US 2008/0024600 A1    Jan. 31, 2008

(30) Foreign Application Priority Data

Jul. 28, 2006    (DE) .......................... 10 2006 034 996

(51) Int. Cl.
- *H04N 9/47* (2006.01)
- *H04N 5/243* (2006.01)
- *H04N 7/18* (2006.01)

(52) U.S. Cl. ............ 348/79; 348/80; 382/128; 382/276; 359/385; 359/386; 359/387; 359/388; 359/389; 359/390

(58) Field of Classification Search .................... 348/79, 348/80; 382/128, 276; 359/385–390
See application file for complete search history.

(56) References Cited

U.S. PATENT DOCUMENTS

| | | | |
|---|---|---|---|
| 4,673,988 A | | 6/1987 | Jansson et al. |
| 6,272,235 B1 | | 8/2001 | Bacus et al. |
| 7,027,628 B1 | * | 4/2006 | Gagnon et al. ................ 382/128 |
| 2003/0198394 A1 | | 10/2003 | Fukuhara et al. |
| 2005/0117816 A1 | | 6/2005 | Saeger et al. |
| 2006/0152582 A1 | * | 7/2006 | Uchida ........................... 348/79 |
| 2006/0159367 A1 | * | 7/2006 | Zeineh et al. ................. 382/276 |
| 2007/0156917 A1 | * | 7/2007 | Hunt et al. ..................... 709/232 |
| 2009/0039260 A1 | * | 2/2009 | Ohnishi ........................ 250/309 |

FOREIGN PATENT DOCUMENTS

| | | |
|---|---|---|
| DE | 102 25 174 A1 | 10/2003 |
| WO | WO 00/02157 | 1/2000 |

OTHER PUBLICATIONS

Catalyürek, Ü., et al., "The Virtual Microscope," *IEEE Transactions on Information Technology in Biomedicine*, vol. 7, No. 4, pp. 230-247 (Dec. 2003).

Zhang, Ya, et al., "Progressive Display of Very High Resolution Images Using Wavelets," *AMIA Symposium*, pp. 944-948 (Dec. 2002).

* cited by examiner

*Primary Examiner* — Haresh N Patel

(74) *Attorney, Agent, or Firm* — Patterson Thuente Christensen Pedersen, P.A.

(57) ABSTRACT

A microscope image processing method includes applying a computing operation to at least one part of a microscope image, having the following steps: (a) providing the image in the mass storage device, (b) breaking down the microscope image into at least two image segments that can be loaded into the working memory and that have a dimension m, where $m \leq n$, (c) for one image segment, determining all pixels that are located in the image segment and in at least one of the partial images, so that a filled image segment results, (d) providing the filled image segment in the working memory, (e) applying the computing operation to the pixels located in the filled image segment so that an image segment result is created, (f) repeating steps (c), (d), and (e) for all image segments, and (g) combining all image segment results to create an overall result.

42 Claims, 7 Drawing Sheets

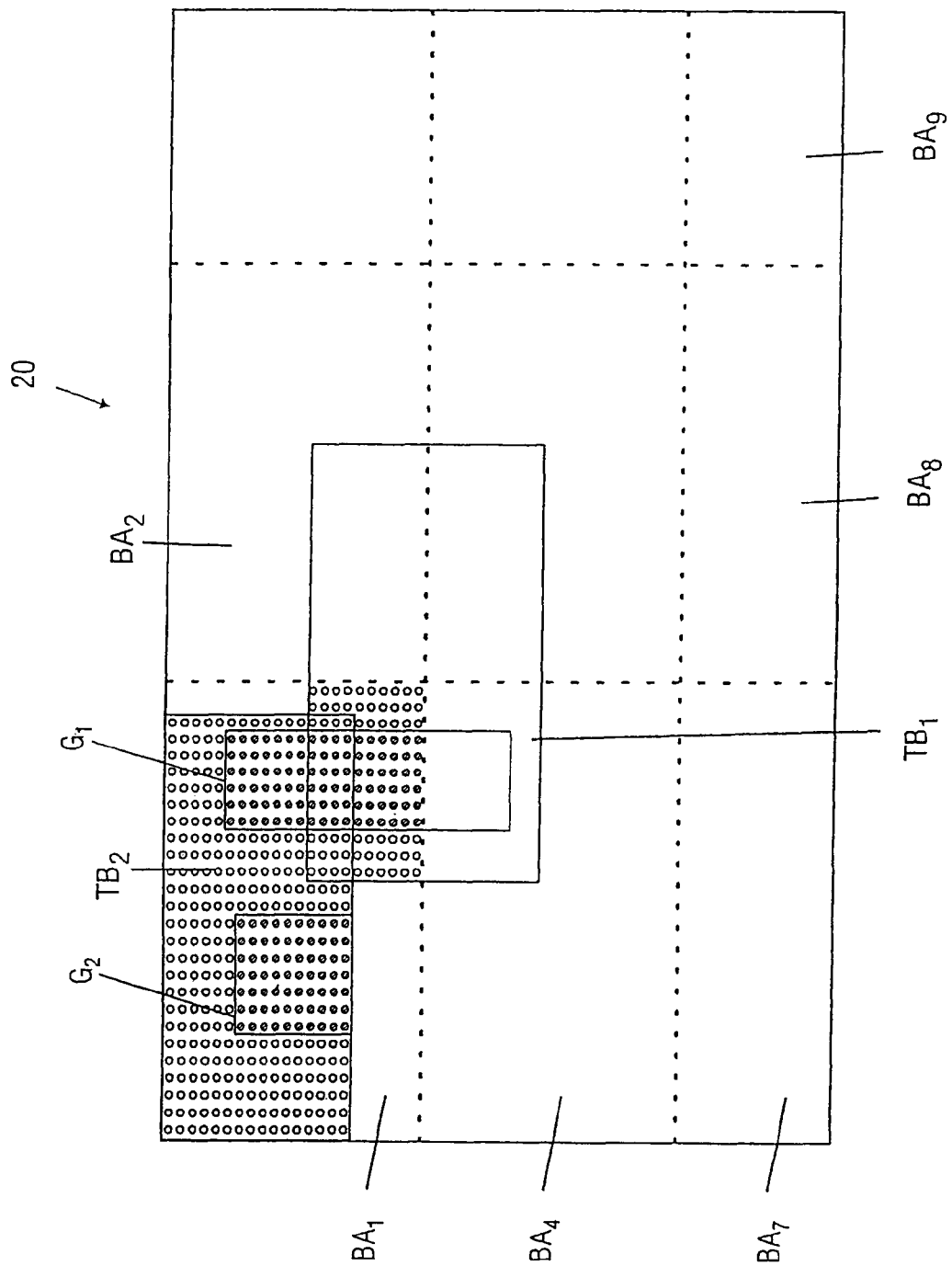

MICROSCOPE PICTURE PROCESSING

RELATED APPLICATION

The present application claims the benefit of priority to German Patent Application No. 10 2006 034 996.2 filed on Jul. 28, 2006. Said application is incorporated by reference herein.

FIELD OF THE INVENTION

The invention relates to a microscope image processing method for execution on a computer that includes a working memory having a pre-specified available memory capacity and a mass storage device that has a longer access time than the working memory, for processing a digital microscope image that comprises pixels, is n-dimensional, where $n>1$, comprises at least two partial images, and has a size that exceeds the available memory capacity of the working memory, by applying a computing operation to at least one part of the microscope image.

BACKGROUND OF THE INVENTION

Such methods are employed in the processing of digital microscope images that are obtained using a digital camera of a microscope. One example is a microscope image of a tissue specimen that was recorded in an enlargement with a microscope and that is selected in a size such that a plurality of partial images is necessary to obtain a microscope image of the entire tissue specimen in the desired enlargement. A computing operation, such as, for instance, finding the mean brightness, in particular in a plurality of partial areas, is to be applied to this digital microscope image that is present in partial images.

U.S. Pat. No. 4,673,988 A1 describes a method for producing such an electronic mosaic image using a microscope. The mosaic image has a high resolution in a wide image field. For recording the mosaic image, in addition to a first camera the microscope includes an image recording means. The specimen for which a mosaic image is to be recorded is moved in a controlled manner in a grid using the image recording means and at previously calculated positions individual partial images are recorded that are then combined to create a microscope image. What this achieves is that the individual partial images do not overlap.

In known methods for processing a digital microscope image, the entire microscope image is loaded into the working memory of the computer and is then processed by a processor of the computer. However, since the entire microscope image is too large to be loaded in its entirety into the, where necessary virtual, working memory of the computer, the microscope image is stored in part on the mass storage device. Such a method is called swapping or paging in English. For it to be possible to execute the computing operation, the image parts must first be re-loaded into the working memory.

It is disadvantageous in such methods that paging is controlled solely by the operating system of the computer, which can lead to image data that could be paged being held in the working memory. Since the mass storage device has a longer access time than the working memory and swapping or paging is time-intensive, this slows processing of the microscope image, which is disadvantageous.

Moreover, a microscope image can be so large that the address space of the processor is not sufficient for loading the microscope image into the working memory so that the microscope image itself cannot be held in the working memory by swapping or paging using the operating system.

In known methods, if the microscope image is so large that it cannot be held in its entirety in the working memory, the partial images are processed individually. The result of this is that either the information about the adjacent partial images is not taken into account, so that inaccuracies occur on the edge, or special algorithms must be worked up to solve this problem of inaccuracies. Frequently these inaccuracies are simply accepted. Then separate algorithms must be found for solving the accuracy problems on the edge.

SUMMARY OF THE INVENTION

It is therefore the object of the present invention to suggest a method for operating a computer for processing a digital microscope image in such a way that the cooperation of the computer components is improved to such an extent that greater speed is permitted when applying a computing operation to the digital microscope image.

The object is inventively attained using a method with the features in claim 1. In accordance with a second aspect, the invention solves the problem using a computer that includes a digital mass storage device and a digital working memory, whereby the computer is characterized in that it is set up for performing an inventive method. In accordance with a third aspect, the invention attains the object using a data carrier that includes software codes, that can be loaded into a digital working memory of a computer, and that codes an inventive method.

It is advantageous in the inventive method that microscope images can be processed that are so large that they exceed the address space for the processor. For such microscope images the invention makes it possible first of all to employ the computer for processing the microscope image. It is furthermore advantageous that using the invention combining the elements of the computer is controlled such that large microscope images can be processed much more rapidly. It is also advantageous that it is possible to attain increased accuracy on the edges of interesting areas of the microscope image.

A digital microscope image comprises a plurality of pixels (image elements) that are indexed, that is, they have a plurality of indices. The number of indices that are necessary to uniquely describe a pixel is the dimension n of the microscope image.

The entirety of all pixels that match in everything down to one index is called a line of the microscope image in the following. For two-dimensional microscope images, vertically depicted lines are called columns.

In the framework of the following description, the size of microscope images and partial images are understood to be sizes in bytes. The size of the microscope image exceeds the storage capacity of the working memory in particular when the microscope image can only be loaded into the working memory at least partially with swapping or paging or when the address space of the processor is exceeded.

A working memory is understood to be especially a random access memory (RAM). A mass storage device is understood to be, for instance, non-volatile memory such as read-only memory (ROM), fixed disks, flash memory, or magneto-optical memory.

The partial images are in particular simple contiguous pixel areas of the digital microscope image, "simple contiguous" being understood consistent with usage in mathematics: "contiguous" means that for every two pixels of the partial image, a path connecting them can always be found exclusively via mutually adjacent pixels of the partial image.

"Simple contiguous" means that the partial image does not have any "holes", that is, that the partial image in particular has an edge and all pixels within the edge belong to the partial image.

It is possible for the partial images to overlap one another. Partial images occur, for instance, when an object is recorded at different locations with a camera of a microscope in that between two recordings the object is moved relative to the camera, for instance in that the object is moved on a scanning table. The positions of the partial images relative to one another are then known in absolute space coordinates. In an alternative method, the partial images are recorded in such a way that they do not overlap one another. In another alternative method the partial images are recorded in such a way that the number of pixels of a partial image in which it overlaps with another partial image is less than 15% of the total number of pixels.

The method is particularly suitable when the computing operation is to be applied not only to a part of the microscope image but to the entire microscope image. In this case, a particularly large number of pixels is to be included in the computing operation so that a particularly great time advantage results during processing.

In the case of a two-dimensional microscope image, the partial images are preferably rectangular. Such partial images can be processed particularly easily.

In the framework of this specification there shall in particular not be a computing operation unless a figure changes due to the computing operation. The identity operation is not considered a computing operation.

Providing the microscope image in the mass storage device occurs preferably in that a positioning unit for the microscope, in particular a scanning table, is moved in a prespecified grid for recording the microscope images, a partial image of a specimen positioned at each grid position by the positioning unit is recorded with a camera of the microscope, and the partial images are provided in the mass storage device of the computer. The partial images recorded by the camera are loaded onto a fixed disk drive of the computer, for instance, via a data link. The mass storage device does not have to be associated with the computer, however. It is also possible that the microscope image is present in the mass storage device of another computer to which the computer has access.

An image segment is characterized in the framework of the present specification by a quantity of pixels that have prespecified coordinates. This means that either the individual indices for the pixels of the microscope image are located at predetermined intervals or that the pixels are located within an interval provided in absolute spatial or time coordinates. The image segments are preferably simple contiguous pixel areas. The term "simple contiguous" was addressed in the foregoing.

If the microscope image is a two-dimensional microscope image, an image segment can be a rectangle, for instance. If it is a three-dimensional microscope image, an image segment can be, for instance, a cuboid. Rectangular or cuboid image segments are advantageously particularly simple to process.

The image segments are established automatically. Criteria for selecting the image segments are discussed further in the following.

When determining all of the pixels that are located in one of the image segments and in at least one of the partial images so that there is a filled image segment, if one pixel is located in a plurality of partial images, the pixel of one partial image is selected. For instance, the pixel is used that is in the partial image that was most recently processed in that pixels that have already been filled are overwritten in the image segment.

Alternatively, the mean is calculated from all of the pixels that are located in the image segment and in one of the partial images. The filled image segment, that is, the quantity of all pixels of the partial images that have the prespecified coordinates of the image segment, is then provided in the working memory.

Preferably at least one of the image segments is, but preferably all of the image segments are, selected to have a maximum size in such a way that random access to the image segment in the working memory is possible when the filled image segment is loaded into the working memory. That is, the filled image segment can be stored in the working memory in its entirety, i.e. without swapping or paging with the mass storage device. This attains particularly rapid image processing. It is particularly preferred when the image segment is selected in such a way that it is also possible to apply the computing operation to this image segment and to store the image segment result in the working memory without swapping or paging with the mass storage device. This further increases the speed of the method.

In order to attain particularly good use of the working memory, preferably at least one of the image segments is, but preferably all of the image segments are, selected at least large enough that the or each image segment takes up more than 30% of the storage capacity of the working memory available at the beginning of the method. Such an image segment is, for instance, larger than 500 Megabytes.

In one preferred method, each of the image segments has an edge with a width of at least one pixel, for instance 2 or 3 pixels. The edge is an area of an image segment that overlaps with other image segments. In alternative methods the edge can also have a width of up to 256 or more pixels. By providing an edge of defined width it is possible to perform proximity operations with greater accuracy. Proximity operations are, for instance, folds and morphological operations. Preferably the elongation of the image segment reduced around the edge is substantially larger than the edge itself, for instance, by a factor of 4.

In another alternative method, the microscope image broken down into at least two image segments is a partitioning of the microscope image. Partitioning is understood to mean breaking down into disjointed parts that together result in the entire microscope image. Thus, after partitioning each pixel of the microscope image each partial image is allocated to precisely one image segment.

In many cases only parts of the microscope image, specifically one area or a plurality of areas, are relevant for an evaluation. Therefore, one preferred method initially includes the step (a) providing the microscope image in the mass storage device. Then in step (a2) at least one area is acquired, specifically an area $G_1$ or areas $G_p$, where $p=1, \ldots N_G$. In step (b), the microscope image is broken down into at least two image segments that can be loaded into the working memory and that have a dimension m, where $m \leq n$. Then in step (c) for one image segment there is a determination of all pixels that are located in the image segment and in at least one of the partial images so that a filled image segment results. This determination does not have to be based on any active computing operation, however. It is enough that after step (c) the pixels are established that form the filled image segment.

This is followed by step (c2); for the filled image segment, forming a segment quantity, comprising pixels, within at least one area. If there are a plurality of areas, this segment quantity is the entirety of all pixels that is located both in the filled image segment and also in at least one of the areas.

Then, in step (d), the filled image segment and/or the segment quantity is provided in the working memory. If the filled image segment or the segment quantity is already provided in the working memory, this step is performed with no further action.

In the subsequent step (e), the computing operation is used on the pixels of the segment quantity so that an image segment result is created. Then in step (f), steps (c), (c2), (d), and (e) are repeated for all image segments, and in step (g) all image segment results are combined to create an overall result.

In one alternative method, the acquisition of at least one area occurs in a subsequent step, for instance prior to step (d).

In another alternative method, the computing operation is applied individually to each segment quantity of the areas with the image segment when there is more than one area so that more than one image segment result is created for each image segment.

One area is preferably a simple contiguous pixel area of the digital microscope image, "simple contiguous" being understood as described in the foregoing.

Acquiring at least one area can, for instance, be reading in according to a dialog with the user. For this, it is possible for the user to select an area from the microscope image, using a graphical user interface, for instance.

In one preferred method, the acquisition of the at least one area occurs prior to establishing the image segments. In this case, instead of the steps cited in claim 1, the following steps result: (a) provision of the microscope image in the mass storage device, (a2) acquisition of at least one area, (b) at least one area is broken down into at least two image segments that can be loaded into the working memory and that have a dimension m, where m≦n, (c) for one image segment, determining all pixels that are located in the image segment and in at least one of the partial images so that a filled image segment results, (d) providing the filled image segment in the working memory or loading the filled image segment into the working memory, (e) applying the computing operation to the pixels located in the filled image segment so that an image segment result is created, (f) repeating steps (c), (d), and (e) for all image segments, and (g) combining all image segment results to create an overall result for the area. The advantage of this method is that the only pixels that have to be loaded into the working memory for the application of the computing operation are those that are located in the area of interest, which increases the speed of the method. For microscope images that exceed the address space of the computer processor, in addition, areas of the microscope image can be processed if the areas are small enough to be addressed by the processor.

In one aspect of the invention, n=3, that is, the digital microscope image is a three-dimensional microscope image. An example of such three-dimensional microscope images are tomographs that have been performed with a microscope. Another example is time sequences of microscope images, the third dimension being time. In one alternative method the microscope images are two-dimensional, so that n=2.

It is particularly simple to process image segments that are rectangular. Rectangular means cuboid with respect to an n-dimensional cuboid. For n=3 this means cuboid in the narrower sense, for n=2 it means rectangular.

In one method, at least one of the image segments is an entire line of the microscope image.

The computing operation to be applied can be a point operation, a proximity operation, an image transformation, and/or a Fourier transformation. In particular the computer operation can be the calculation of a measured value. Measured values are, for instance, the sum of grayscale values, the sum of the squares of the grayscale values, the minimum and maximum of the grayscale values, the texture and surface area across the area.

It is advantageous when an identification parameter of the area is assigned to each result of the application of the computing operation to the segment quantity of the image segment within the area. This makes it particularly simple to calculate the overall result.

BRIEF DESCRIPTION OF THE DRAWINGS

The method is explained in the following using the attached drawings.

FIG. 3b is a filled image segment that results from the first image segment of the microscope image in accordance with FIG. 3a;

DETAILED DESCRIPTION

Figure 1:
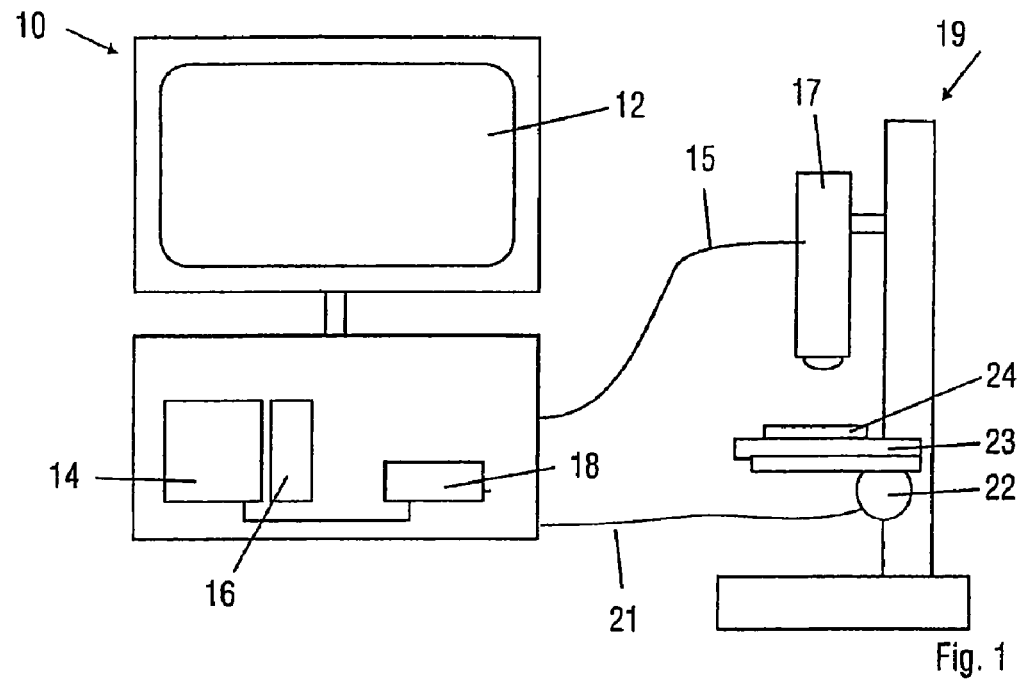
FIG. 1 is a schematic depiction of a computer.

FIG. 1 schematically depicts a computer 10 that, in addition to a screen 12, has a processor 14 that is connected to a working memory 16 and a mass storage device 18. The working memory 16 has a maximum storage capacity. When the computer 10 is operating, a portion of the maximum storage capacity is required, for instance, for processes of an operating system of the computer 10 so that when the computer 10 is operating the working memory 16 has an available storage capacity that is less than its maximum storage capacity. The available storage capacity of the working memory 16 is available for executing an inventive method.

The mass storage device 18 has a clearly greater storage capacity, for instance greater by a factor of five, than the working memory. The computer 10 can be connected via a network cable (not shown) to a network in order to be able to access mass storage devices of other computers. The computer 10 can be connected to a camera 17 of a microscope 19 via a data link 15. The microscope and the computer 10 then form a microscopy system.

For recording a microscope image, the computer 10 transmits a control impulse via a data cable 21 to a step motor 22, which then moves a positioning unit 23. Affixed to the positioning unit 23 is a specimen 24 that therefore moves relative to the camera 17. When a prespecified position is attained, the computer 10 transmits a control impulse to the camera 17, which then records a partial image of the sample 24. Then another prespecified position is assumed and another partial image is recorded. This procedure is performed until a prespecified number of partial images with prespecified coordinates relative to one another or relative to the specimen 24 have been assumed and partial images have been recorded for each. The recorded partial images are transmitted via the data cable 21 to the computer and are stored there on the mass storage device 18.

Figure 2:
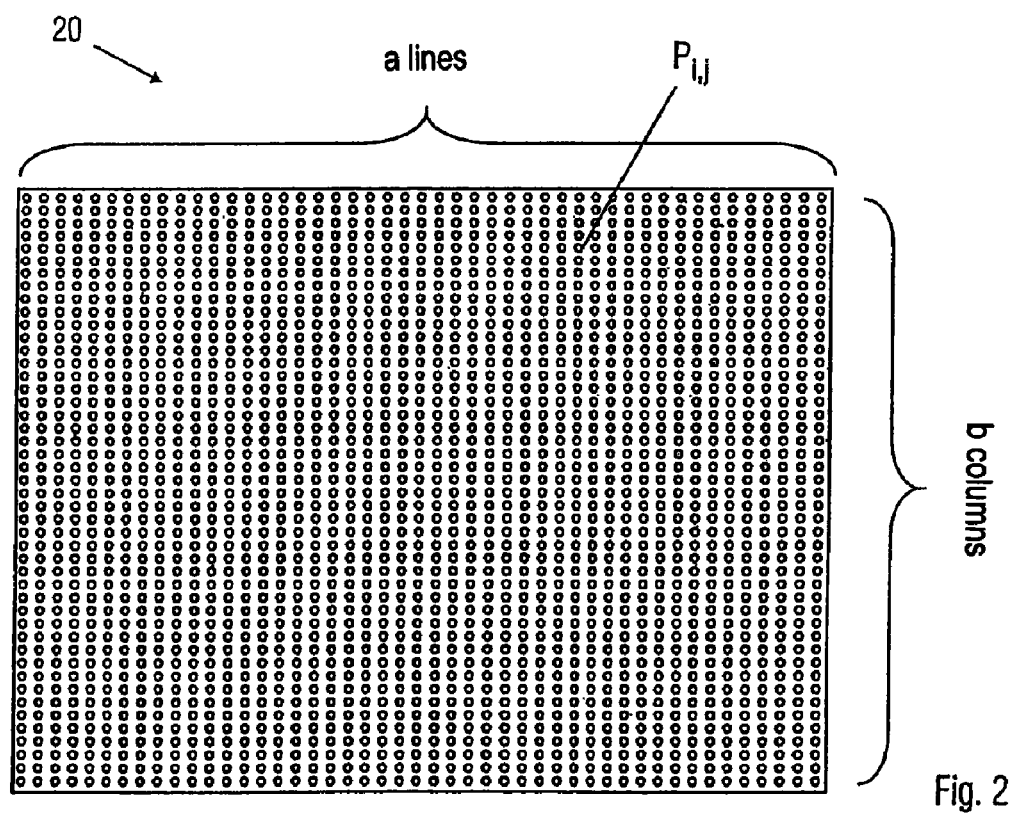
FIG. 2 is a schematic depiction of a two-dimensional microscope image.

FIG. 2 schematically depicts pixels $P_{i,j}$ of a microscope image 20. The pixels are arranged in a lines, which run horizontally, and b lines, which run vertically and are therefore also called columns. Each pixel $P_{i,j}$ can be uniquely determined using a first index i (line number) and a second index j (column number). The microscope image 20 therefore has the dimension n=2.

Figure 3A:
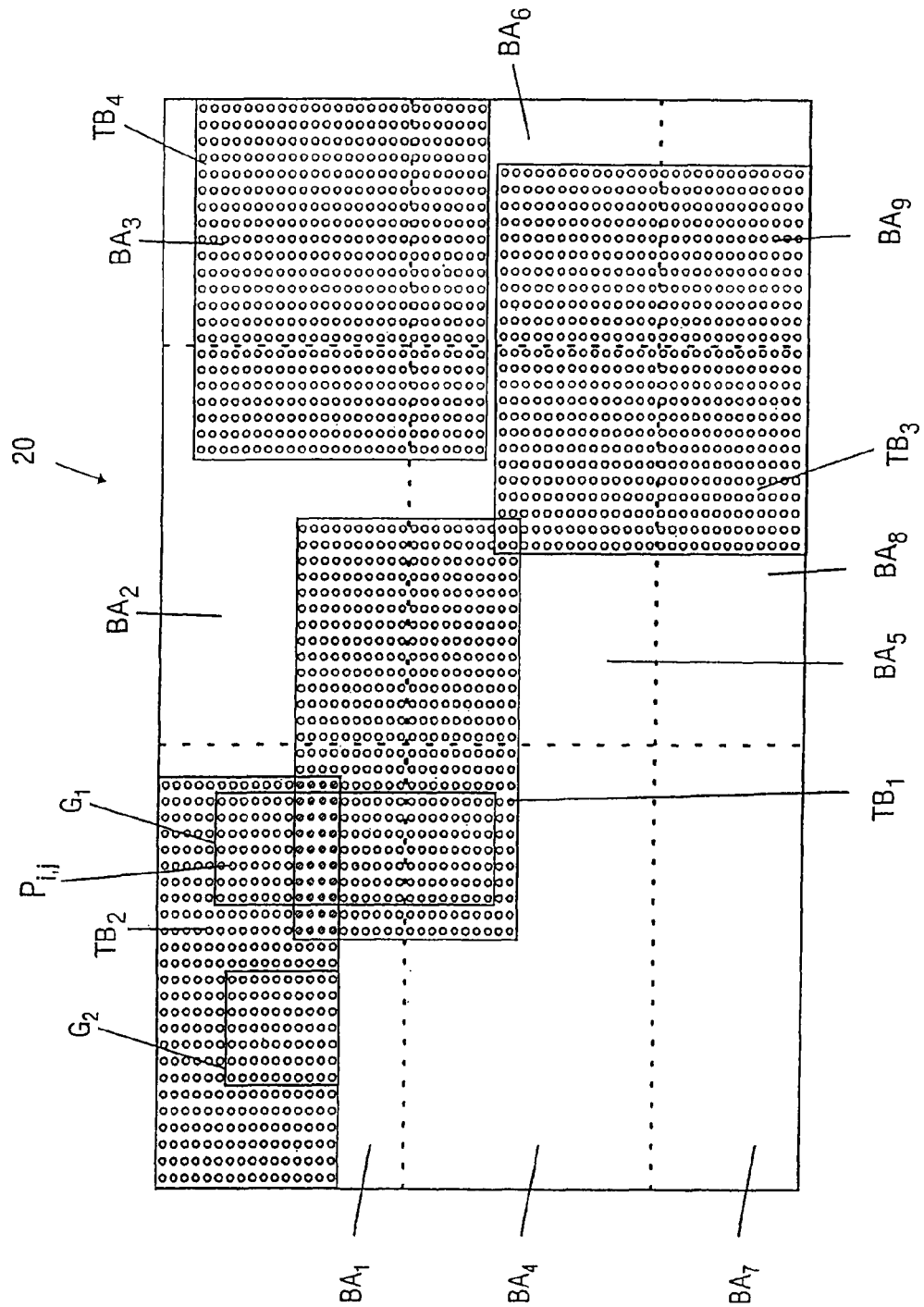
FIG. 3a is a schematic depiction of a two-dimensional microscope image that has four partial images and is broken down into nine image segments.

FIG. 3a schematically depicts a microscope image 20 that comprises four partial images $TB_1$, where l=1, 2, 3, 4, that is, four partial images $TB_1$, $TB_2$, $TB_3$, $TB_4$, that are identified with the solid edges. In FIG. 3a, as well, each pixel $P_{i,j}$ can be uniquely identified using line and column, that is first index i and second index j. The microscope image 20 has a size that exceeds the available storage capacity of the working memory 16.

For performing the inventive method, the microscope image 20 is first provided in the mass storage device 18. In the present instance this occurs in that the partial images of the microscope image 20 are recorded using the camera 17 of the microscope 19 and are loaded via the data link 15 onto a fixed disk drive as the mass storage device 18.

Then the microscope image is broken down into nine image segments $BA_1$, $BA_2$, $BA_3$, ... $BA_9$, the boundaries of which are indicated with broken lines in FIG. 3a. The image segments $BA_k$ are selected in such a way that the desired computing operation can be executed. For instance, if a line-based computing operation is to be executed on the microscope image, the image segments are selected in such a way that they include entire lines, e.g. one line.

The image segments $BA_k$ indicated in FIG. 3a are disjointed and the unification of all image segments $BA_k$ includes all pixels in the microscope image 20 so that the image segments $BA_k$ involve partitioning of the microscope image 20.

Now, first all pixels are determined that are located in one of the image segments, for instance in the first image segment $BA_1$, and in at least one of the partial images $TB_1$ through $TB_4$. In the example depicted in FIG. 3a, there are pixels from the first partial image $TB_1$ and from the second partial image $TB_2$ that are located in the image segment $BA_1$. On the other hand, no pixels from the partial images $TB_3$ and $TB_4$ are located in the image segment $BA_1$. The pixels that are located in the image segment $BA_1$ and in one of the partial images are depicted schematically in FIG. 3b. These pixels form a first filled image segment and are loaded into the working memory 16. The hash-marked pixels in FIG. 3a are located both in the first partial image $TB_1$ and in the second partial image $TB_2$. One of the pixels is selected, in the present case it is the pixel in the first partial image $TB_1$. The filled image segment therefore does not include all of the pixels in the second partial image $TB_2$, although the second partial image $TB_2$ is enclosed by the first image segment $BA_1$.

Figure 3C:
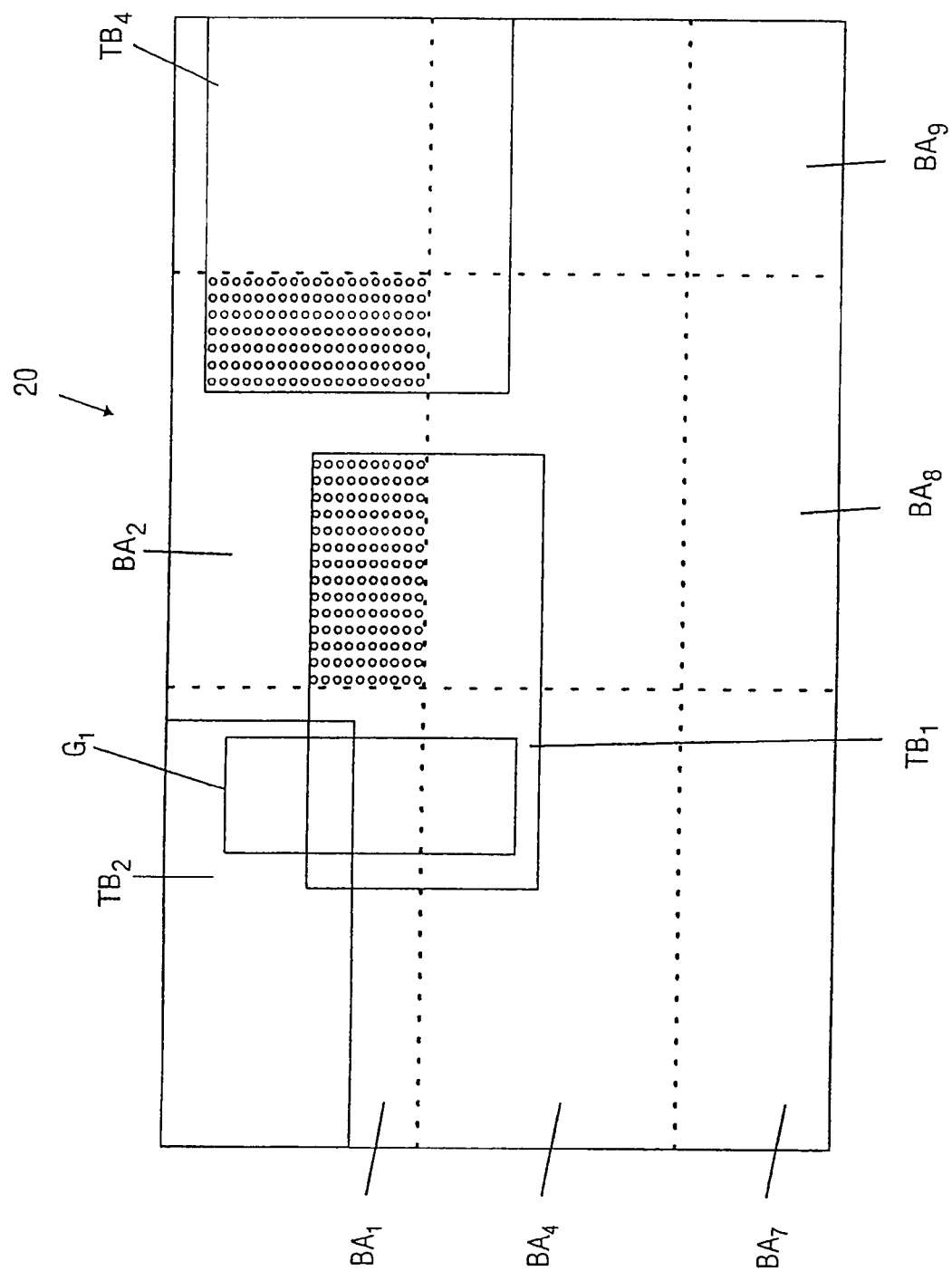
FIG. 3c is the filled image segment that results from the second image segment of the microscope image in accordance with FIG. 3a; and, FIG. 4 is another schematic depiction of a microscope image that comprises four partial images and that is broken down into five image segments that include entire lines of the microscope image; and, FIGS. 5 and 6 are flowcharts for the inventive method.

The computing operation is applied to the pixels located in the first filled image segment $BA_1$ so that a first image segment result is created. Then the step of determining all pixels that are located in one of the image segments and in at least one of the partial images is repeated for a next image segment, for instance for the second image segment $BA_2$. The pixels that are located in the image segment $BA_2$ and in at least one of the partial images are depicted in FIG. 3c and form a second filled image segment. This second filled image segment is also provided in the working memory 16. Then the computing operation is applied to the pixels located in the second filled image segment so that a second image segment result is created.

These steps are repeated for all of the remaining image segments $BA_3$ through $BA_9$ and all of the image segment results are then combined to create an overall result for the entire microscope image 20.

It should be noted that there is no pixel $P_{i,j}$ that is located in the image segment $BA_7$ and in one of the partial images. There is therefore no filled image segment for the image segment $BA_7$ and when the computing operation is applied to this blank pixel quantity there is no result. The overall result is thus not affected.

Figure 4:
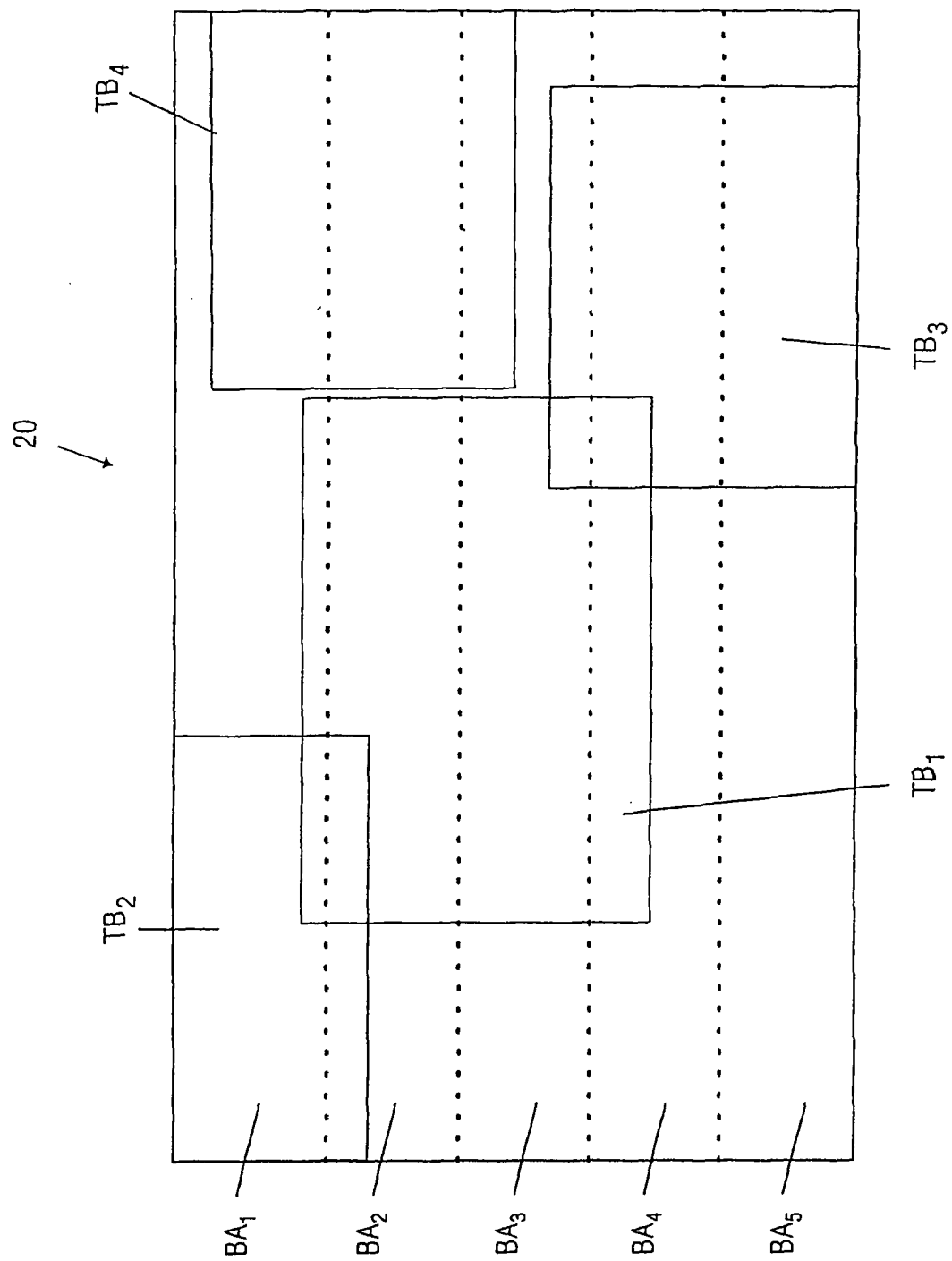

FIG. 4 depicts the microscope image 20 in which the image segments $BA_1$ through $BA_5$ are selected in such a way that they include entire lines of the microscope image. For the image segments selected in this manner the method is also performed as described in the foregoing. The breakdown depicted in FIG. 4 is used when a line-based computing operation is to be applied to the microscope image 20.

Figure 5:
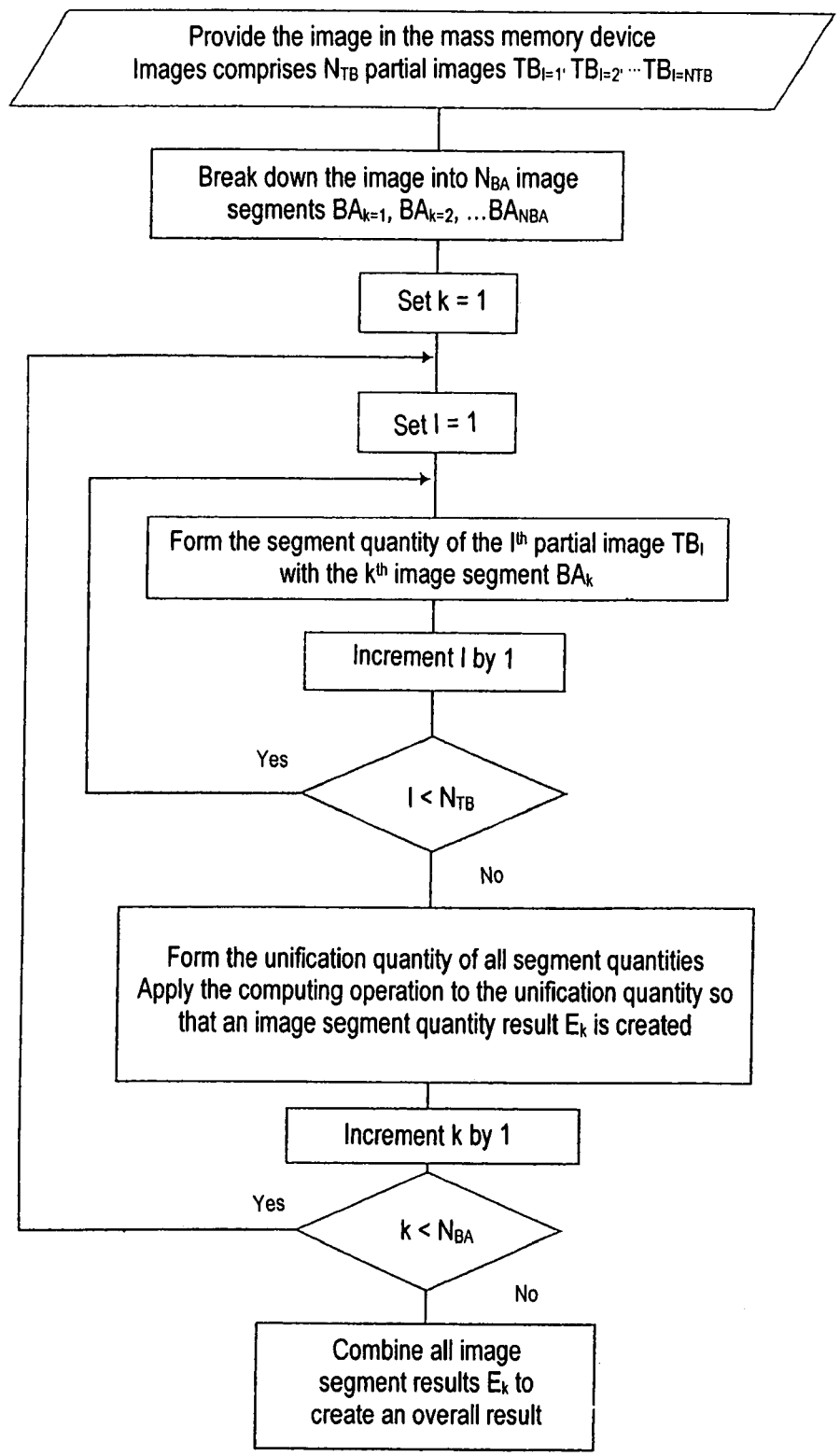

FIG. 5 depicts a flowchart for an inventive method as it was described in connection with FIGS. 3a through 3c. First the microscope image that comprises $N_{TB}$ partial images is provided in the mass storage device. Then the microscope image is broken down or partitioned into $N_{BA}$ image segments. In an internal loop, the segment quantities are formed with the partial image $TB_1$ for a solid image segment $BA_k$. All l=1, 2, ... $N_{TB}$ are run through, that is, the segment quantities of the image segment $BA_k$ are computed with all partial images $TB_1$.

If all of the partial images $TB_1$ are run through, the unification quantity of all of these segment quantities is formed. This unification quantity contains all pixels that are contained both in the image segment $BA_k$ and also in one of the partial images $TB_1$. If a pixel is present in a plurality of partial images, only the pixel of one partial image is used. Alternatively, a mean is calculated from the pixel that is present several times. Then the computing operation is applied to this unification quantity so that an image segment result $E_K$ is created.

In an external loop all image segments $BA_k$ are run through. The index k runs from 1 through $N_{BA}$. If all of the image segments $BA_k$ have been run through, the individual image segment results $E_k$ are combined to create an overall result for the image.

Figure 6:
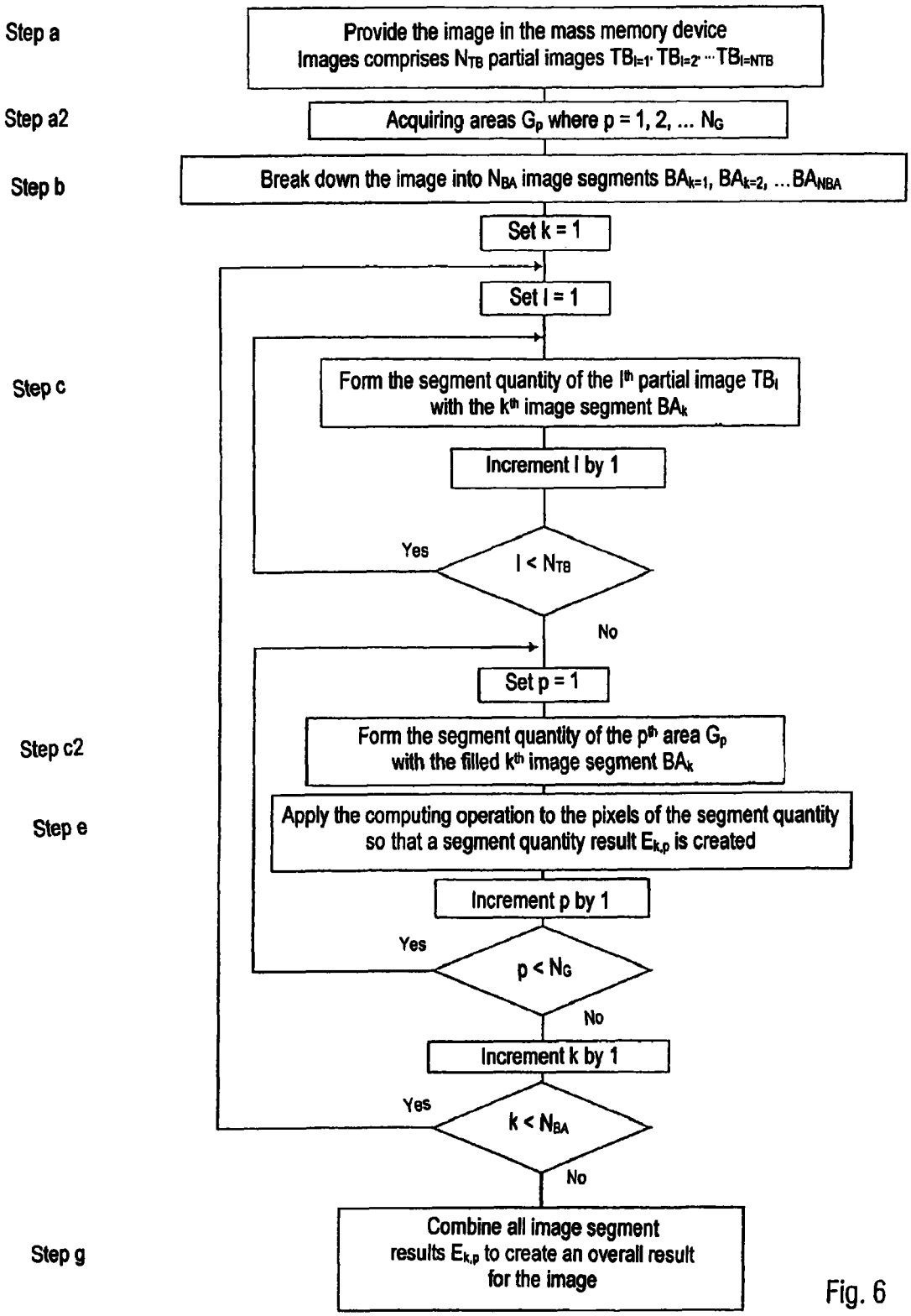

A flowchart of another inventive method is depicted in FIG. 6. In a first step (a) the microscope image 20, which comprises $N_{TB}$ partial images, is provided in the mass storage device. In a further step (a2), at least one area $G_p$ is acquired. This occurs, for instance, in that a user of the computer inputs an area via a graphical user interface, for instance by means of a mouse. A total of $N_G$ areas are acquired.

In a subsequent step (b) the microscope image 20 is broken down or partitioned into $N_{BA}$ image segments $BA_k$. In a first internal loop, for a fixed image segment $BA_k$, for instance the first image segment $BA_1$, the segment quantity of the 1st partial image $TB_1$ is formed with this image segment $BA_K$. After this internal loop has been run through, in a step that is not shown pixels that are available in duplicate are removed, as is described at the top of FIG. 5. Thus the segment quantity of the $k^{th}$ image segment $BA_k$ is obtained with all partial images, that is, the entirety of all pixels that are located both in the $k^{th}$ image segment and also in at least one of the partial images. This segment quantity is the filled image segment. The filled image segment for the first image segment $BA_1$ is schematically depicted in FIG. 3b.

In a subsequent internal loop the segment quantities with the areas $G_p$ are formed for the filled $k^{th}$ image segment $BA_k$, in this case then for $BA_1$, and the computing operation is applied to the segment quantities. FIG. 3b schematically depicts two areas $G_1$ and $G_2$. The pixels in the two segment quantities of $G_1$ and $G_2$ with the filled image segment of the image segment $BA_1$ are shown with hash marks.

The computing operation is applied to these pixels with the hash marks. A segment quantity result $E_{k,p}$ is created. The index p for the area functions as an identification parameter. In a subsequent step, the segment results $E_{k,p}$ are combined to create an image segment result $E_k$. The image segment results $E_k$ are then combined to create an overall result for the image. Alternatively, the segment quantity results $E_{k,p}$ are combined to create area results $E_p$.

The invention claimed is:

1. Microscope image processing method for execution on a computer the computer including
 a working memory having a pre-specified available memory capacity and
 a mass storage device that has a longer access time than said working memory,
 for processing a digital microscope image that
  comprises pixels ($P_{i,j}$),
  is n-dimensional, where n>1,
  comprises at least two partial images ($TB_1$) each partial image being a simple contiguous pixel area that is a subpart of the digital microscope image, and
  wherein the digital microscope image has a size that exceeds the available memory capacity of said working memory,
 by applying a computing operation to at least one part of said microscope image, comprising:
  (a) storing said microscope image in said mass storage device,
  (b) breaking down said microscope image into at least two image segments ($BA_k$) that are small enough to be loaded into said working memory and that have a dimension m, where m≦n, each image segment defining a selected quantity of pixels that have preselected coordinates,
  (c) for one image segment ($BA_k$), determining all pixels that are located in said image segment ($BA_k$) and in at least one of said partial images ($TB_1$), so that a filled image segment results, the filled image segment being made up of all of the pixels that are located both in the image segment and also in the at least one of the partial images,
  (d) storing said filled image segment in said working memory,
  (e) applying said computing operation to said pixels ($P_{i,j}$) located in said filled image segment so that an image segment result is created,
  (f) repeating steps (c), (d), and (e) for all the image segments ($BA_k$),
  (g) combining all images the segment results to create an overall result;
 capturing said microscope image by
 moving a positioning unit for a microscope in a pre-specified grid for recording said microscope images,
 recording a partial image ($TB_1$) of a specimen affixed to said positioning unit at each grid position with a camera of said microscope, and
 storing said partial images ($TB_1$) in said mass storage device of said computer.

2. The microscope image processing method in accordance with claim 1, wherein each image segment ($BA_k$) has an edge with a width of at least one pixel.

3. The microscope image processing method in accordance with claim 1, wherein breaking down said microscope image into at least two image segments ($BA_k$) comprises partitioning said microscope image.

4. The microscope image processing method in accordance with claim 1, wherein n=3.

5. The microscope image processing method in accordance claim 1, wherein m=3.

6. The microscope image processing method in accordance with claim 1, wherein n=2.

7. The microscope image processing method in accordance with claim 1, wherein m=2.

8. The microscope image processing method in accordance with claim 7, wherein said image segments ($BA_k$) include entire lines of said microscope image.

9. The microscope image processing method in accordance with claim 1, wherein said image segments are rectangular.

10. The microscope image processing method in accordance with claim 1, said computing operation further comprising a point operation, a proximity operation, an image transformation, a Fourier transformation or a combination of the foregoing.

11. The microscope image processing method in accordance claim 1, wherein said computing operation includes a calculation based on a measured value.

12. The microscope image processing method in accordance with claim 1, further comprising:
 assigning an identification parameter (p) for each area ($G_p$) to each result ($E_{k,p}$) of the application of said computing operation to the segment quantity of said image segment with said area ($G_p$).

13. A microscope that includes a digital mass storage device and a digital working memory, wherein said computer is set up for executing a microscope image processing method in accordance with claim 1.

14. A computer program stored on a non-transitory computer storage medium that is loaded into a digital working memory of a computer and codes a microscope image processing method in accordance with claim 1.

15. Microscope image processing method for execution on a computer the computer including:
 a working memory having a pre-specified available memory capacity and
 a mass storage device that has a longer access time than said working memory,
 for processing a digital microscope image that
  comprises pixels ($P_{i,j}$),
  is n-dimensional, where n>1,
  comprises at least two partial images ($TB_1$), each partial image being a simple contiguous pixel area that is a subpart of the digital microscope image, and wherein the digital microscope image has a size that exceeds the available memory capacity of said working memory,
 by applying a computing operation to at least one part of said microscope image, comprising:
  (a) storing said microscope image in said mass storage device, acquiring at least one area ($G_p$),
  (b) breaking down said microscope image into at least two image segments ($BA_k$) that are small enough to be loaded into said working memory and that have a dimension m, where m≦n, each image segment defining a selected quantity of pixels that have preselected coordinates,
  (c) for one image segment ($BA_k$), determining all pixels that are located in said image segment ($BA_k$) and in at least one of said partial images ($TB_1$), so that a filled image segment results, the filled image segment being made up of all of the pixels that are located both in the image segment and also in the at least one of the partial images,
  (c2) for said filled image segment images from a segment quantity comprising pixels and having the at least one area ($G_p$), (d) storing said filled image segment in said working memory, (e) applying said computing operation to said pixels of said segment quantity so that an image segment result is created, an (f) repeating steps (c), (c2), (d), and (e) for all the image segments, (g) combining all images the segment results to create an overall result;

capturing said microscope image by moving a positioning unit for a microscope in a pre-specified grid for recording said microscope images, recording a partial image ($TB_1$) of a specimen affixed to said positioning unit at each grid position with a camera of said microscope, and storing said partial images ($TB_1$) in said mass storage device of said computer.

16. The microscope image processing method in accordance with claim 15, wherein each image segment ($BA_k$) has an edge with a width of at least one pixel.

17. The microscope image processing method in accordance with claim 15, wherein breaking down said microscope image into at least two image segments ($BA_k$) comprises partitioning said microscope image.

18. The microscope image processing method in accordance with claim 15, wherein n=3.

19. The microscope image processing method in accordance claim 15, wherein m=3.

20. The microscope image processing method in accordance with claim 15, wherein n=2.

21. The microscope image processing method in accordance with claim 15, wherein m=2.

22. The microscope image processing method in accordance with claim 21, wherein said image segments ($BA_k$) include entire lines of said microscope image.

23. The microscope image processing method in accordance with claim 15, wherein said image segments are rectangular.

24. The microscope image processing method in accordance with claim 15, said computing operation further comprising a point operation, a proximity operation, an image transformation, a Fourier transformation or a combination of the foregoing.

25. The microscope image processing method in accordance claim 15, wherein said computing operation includes a calculation based on a measured value.

26. The microscope image processing method in accordance with claim 15, further comprising:

assigning an identification parameter (p) for each area ($G_p$) to each result ($E_{k,p}$) of the application of said computing operation to the segment quantity of said image segment with said area ($G_p$).

27. A microscope that includes a digital mass storage device and a digital working memory, wherein said computer is set up for executing a microscope image processing method in accordance with claim 15.

28. A computer program stored on a non-transitory computer storage medium that is loaded into a digital working memory of a computer and codes a microscope image processing method in accordance with claim 15.

29. Microscope image processing method for execution on a computer the computer including:

a working memory having a pre-specified available memory capacity and a mass storage device that has a longer access time than said working memory, for processing a digital microscope image that comprises pixels ($P_{i,j}$), is n-dimensional, where n>1, comprises at least two partial images ($TB_1$), and has a size that exceeds the available memory capacity of said working memory, by applying a computing operation to at least one part of said microscope image, comprising:

(a) storing said microscope image in said mass storage device, (a2) acquiring at least one area ($G_p$), (b) breaking down at least one area ($G_p$) into at least two image segments that are small enough to be loaded into said working memory (16) and have a dimension m, where m≦n and assigning an identification parameter (p) for each area ($G_p$) to each result ($E_{k,p}$) of the application of said computing operation to the segment quantity of said image segment with said area ($G_p$);

(c) for one image segment ($BA_k$), determining all pixels that are located in said image segment ($BA_k$) and in at least one of said partial images ($TB_1$), so that a filled image segment results, (d) storing said filled image segment in said working memory, (e) applying said computing operation to said pixels ($P_{i,j}$) located in said filled image segment so that an image segment result is created, (f) repeating steps (c), (d), and (e) for all the image segments ($BA_k$), and (g) combining all image the segment results to create an overall result for said area ($G_p$).

30. The microscope image processing method in accordance with claim 29, further comprising:

capturing said microscope image by moving a positioning unit for a microscope in a pre-specified grid for recording said microscope images, recording a partial image ($TB_1$) of a specimen affixed to said positioning unit at each grid position with a camera of said microscope, and storing said partial images ($TB_1$) in said mass storage device of said computer.

31. The microscope image processing method in accordance with claim 29, wherein each image segment ($BA_k$) has an edge with a width of at least one pixel.

32. The microscope image processing method in accordance with claim 29, wherein breaking down said microscope image into at least two image segments ($BA_k$) comprises partitioning said microscope image.

33. The microscope image processing method in accordance with claim 29, wherein n=3.

34. The microscope image processing method in accordance claim 29, wherein m=3.

35. The microscope image processing method in accordance with claim 29, wherein n=2.

36. The microscope image processing method in accordance with claim 29, wherein m=2.

37. The microscope image processing method in accordance with claim 36, wherein said image segments ($BA_k$) include entire lines of said microscope image.

38. The microscope image processing method in accordance with claim 29, wherein said image segments are rectangular.

39. The microscope image processing method in accordance with claim 29, said computing operation further comprising a point operation, a proximity operation, an image transformation, a Fourier transformation or a combination of the foregoing.

40. The microscope image processing method in accordance claim 29, wherein said computing operation includes a calculation based on a measured value.

41. A microscope that includes a digital mass storage device and a digital working memory, wherein said computer is set up for executing a microscope image processing method in accordance with claim 29.

42. A computer program stored on a non-transitory computer storage medium that is loaded into a digital working memory of a computer and codes a microscope image processing method in accordance with claim 29.

* * * * *

UNITED STATES PATENT AND TRADEMARK OFFICE
CERTIFICATE OF CORRECTION

| | | |
|---|---|---|
| PATENT NO. | : 8,217,998 B2 | Page 1 of 1 |
| APPLICATION NO. | : 11/881594 | |
| DATED | : July 10, 2012 | |
| INVENTOR(S) | : Zoephel | |

It is certified that error appears in the above-identified patent and that said Letters Patent is hereby corrected as shown below:

In the Specification

Col. 6, line 63, insert --10-- after "computer"

In the Claims

Col. 9, line 66, claim 5, insert --with-- after "accordance"

Col. 10, line 15, claim 11, insert --with-- after "accordance"

Col. 11, line 5, claim 15, delete "an"

Col. 11, lines 28-29, claim 19, insert --with-- after "accordance"

Col. 11, lines 45-46, claim 25, insert --with-- after "accordance"

Col. 12, lines 51-52, claim 33, insert --with-- after "accordance"

Col. 13, lines 1-2, claim 40, insert --with-- after "accordance"

Signed and Sealed this
Twenty-third Day of September, 2014

Michelle K. Lee
*Deputy Director of the United States Patent and Trademark Office*